United States Patent [19]

Wiedemann et al.

[11] Patent Number: 4,648,784

[45] Date of Patent: Mar. 10, 1987

[54] DRIVE PROTECTION DEVICE CONNECTABLE BETWEEN TWO PORTIONS OF A DRIVEN OPERATING DEVICE

[75] Inventors: Kurt Wiedemann; Werner Schwarz, both of Augsburg, Fed. Rep. of Germany

[73] Assignee: Kuka Schweissanlagen + Roboter GmbH, Fed. Rep. of Germany

[21] Appl. No.: 735,343

[22] Filed: May 17, 1985

[30] Foreign Application Priority Data

May 19, 1984 [DE] Fed. Rep. of Germany ....... 3418720

[51] Int. Cl.⁴ ............................................. B25J 9/00
[52] U.S. Cl. ..................................... 414/730; 464/35; 901/29; 901/49
[58] Field of Search ................... 414/730, 735; 901/9, 901/28, 29, 49; 464/35, 23

[56] References Cited

U.S. PATENT DOCUMENTS

| | | | |
|---|---|---|---|
| 2,311,230 | 2/1943 | Hill | 464/35 X |
| 3,599,781 | 8/1971 | Hoadley | 464/35 X |
| 3,727,432 | 4/1973 | Eaves et al. | 464/35 |
| 4,540,331 | 9/1985 | Stanner et al. | 901/29 X |

FOREIGN PATENT DOCUMENTS

| | | |
|---|---|---|
| 2749603 | 6/1980 | Fed. Rep. of Germany . |
| 2717871 | 3/1981 | Fed. Rep. of Germany . |
| 3338412 | 2/1985 | Fed. Rep. of Germany . |

*Primary Examiner*—Robert J. Spar
*Assistant Examiner*—Donald W. Underwood
*Attorney, Agent, or Firm*—McGlew and Tuttle

[57] ABSTRACT

An improvement of a device for protecting manipulators against collision with other objects. Two discs are held in spaced relationship by spacer balls applied thereagainst on the periphery. The discs are urged toward each other and the gap is adjustable. If due to a collision, the position of the spacer balls is changed, the discs move toward each other, thereby causing actuation of a switch and a disconnection of the drive.

13 Claims, 2 Drawing Figures

DRIVE PROTECTION DEVICE CONNECTABLE BETWEEN TWO PORTIONS OF A DRIVEN OPERATING DEVICE

FIELD AND BACKGROUND OF THE INVENTION

This invention relates in general to manipulating devices and in particular to a new and useful device connected between a working arm and a tool in which a stress of two of the operating parts is effective to disconnect the drive.

Similar safety devices are disclosed in German Pat. No. 27 17 871 and in German AS No. 27 49 603.

The problem posed is to abruptly stop the automatically controlled motion of a manipulator as soon as one of the constructional parts of the manipulator unexpectedly encounters an obstacle. It is mostly the tool of the manipulator which undesirably strikes against a portion of the workpiece to be handled. By stopping the automatically controlled motion, damages are to be avoided.

In prior art designs, such safety devices are preferably provided at the end of the cantilever arm of the manipulator, between the last member and the tool. In the design of the two above references, the constructional parts connected to each other are associated with each other through a non-positively engaged guidance. The force holding the parts together and produced by one or more springs is so strong that under normal operating conditions, the connection of the constructional parts joined to each other is relatively immovable. However, as soon as the tool or another part of the manipulator unexpectedly encounters a resistance, the non-positive connection of the constructional parts yields, the yielding motion is detected by a switch responsive thereto and used for disconnecting the drive.

The prior art safety devices are designed to react to three-dimensional changes in their non-positively maintained centered position. This is easily obtained in instances where the two constructional parts move toward each other coaxially or are turned relative to each other in the circumferential direction. Collisions observed in practice, however, occur under forces which do not act in specific directions, to which the prior art devices are not so well responsive as to loads in the axial direction or transversely thereto.

SUMMARY OF THE INVENTION

The invention is directed to a safety device for manipulators which is capable of unobstructedly reacting to any collision, independently of the direction from which a force acts.

In accordance with the invention, a protection device is connectable between two portions of a driven operating device and it includes two members which are arranged in spaced apart relationship by displaceable spacers. The two members are biased in a selected direction, for example, together and that spacers are displaceable upon disruption of either of the two parts so as to operate a switch for disconnecting the drive operating the device.

The invention starts from the basic idea of holding two operating members non-positively connected together in spaced apart position by means of spacer elements. Upon a collision the displacement of one of the operating members relative to the other is to act directly on the spacer elements to change the distance between the operating members. A switch is responsive to this change and causes a disconnection of the drive.

It will be understood that this idea may be embodied in various ways. The invention therefore is not limited to the design shown by way of example in the drawings. Both the operating members and the spacer elements as well as the switch may be provided in a variety fo designs.

In accordance with a feature of the invention two disc members are provided as the operating members which are coaxially guided relative to each other and urged against each other by springs. The spacer elements comprise balls which are arranged at the periphery of the elements and are guided and held in a position by stop elements which can change their position in the event of a collision.

Upon a collision, the stop elements change their position. In consequence, the spacer elements designed as balls also change their position with the result that the spacing between the operating members, i.e. the discs, is also changed. To guide the balls smoothly, the edges facing each other of the two discs are chamfered.

It is advisable to provide on one of the discs a proximity switch, and on the other disc an adjustable stop element, such as a control lug, cooperating therewith. The shape of the switch may also be varied in many ways.

One of the advantages of the invention is that through the spacer elements, the discs are guided in one of the two constructional parts and, in addition, secured against rotation. The discs thus secure the centered position of the constructional parts.

Another substantial feature is the design of the two constructional parts. It has been found advantageous to provide that the constructional parts are connected to each other by a plurality of, preferably three, centering balls which are radially guided in the constructional part embracing the inner constructional part, and are spring biased and engage a spherical guide surface of the inside construction part.

The two constructional parts are thus connected to each other by three ball joints which are under load, particularly spring biased. Upon any disturbance of this non-positively maintained position, the switch responds and the drive is disconnected.

Another preferred design is that the individual spherical guide surface bounds a radial bore of the inner constructional part, in which at least one ball intended as a spacer element is guided while being in direct or indirect contact with the centering ball.

The ball embodying the spacer element and the centering ball and, if provided, a connecting ball therebetween, are located in a common plane radial to the axis of rotation of the constructional parts connected to each other. A force acting from any direction on one of the constructional parts displaces the centering ball out of position. This further causes a relative movement of the ball provided as a spacer element since this ball is held in position through the centering ball. The spacer ball thus follows the yielding of the centering ball. In this way, the spacing between the discs is changed and the switch disconnects the drive.

Since the centering balls are clamped against spherical guide surfaces, they yield in the same way and to the same extent to any force; it is irrelevant in what direction the force acts.

The invention also provides that the outer constructional part comprises radially extending chambers which are accessible from the outside and include at their bottom the guideway for the centering ball, and in which spring stacks, such as cup springs, acting on the centering balls and biasing means therefor are provided.

This design has the advantage that the safety device can be adjusted in a very simple way from the outside without the necessity of removing the tool from the arm of the manipulator.

Accordingly, it is an object of the invention to provide a drive disconnection device which is operable by displacement of one part relative to another of an operating mechanism.

A further object of the invention is to provide safety device which is simple in design, rugged in construction and economical to manufacture.

The various features of novelty which characterize the invention are poined out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
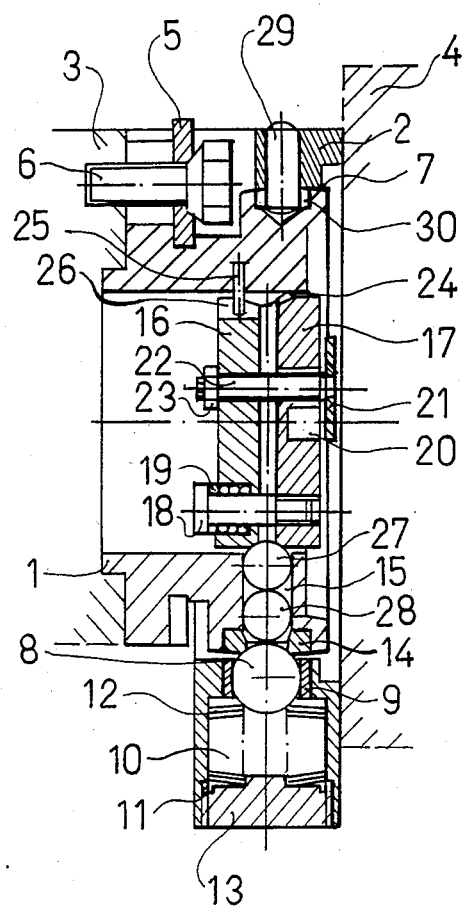
FIG. 1 is a radial sectional view of an inventive safety device, corresponding to a section along the line I—I of FIG. 2.

Referring to the drawings in particular, the invention embodied therein comprises a protection device which is connectable between two portions, for example, an outer part 2 and an inner part 1 of a driven operating device such as a working arm which has a secondary arm portion 4 which is connectable between the two parts to a tool 3. In accordance with the invention, first and second members in the form of operating discs 16 and 17 are filled by displaceable spacer means such as spacer elements 27,28 and 8. Spacer elements are biased together by a spring 19 and switch means 20 which are connectable to the drive mechanism and is actuated by at least one of the parts 16 and 17 upon predetermined relative movement between the parts as permitted by the spacer means.

FIG. 1 shows two constructional parts 1, 2 of a manipulator. Preferably, part 1 receives a tool 3, and part 2 is that which is connected to the last secondary member 4 of a working arm of a manipulator. In normal operating position, the two constructional parts 1, 2 are firmly connected to each other. In the event of a collision, for example, if the tool encounters an obstacle, this firm connection of the two constructional parts 1 and 2 is not rigid, but flexible, the movement of one of the parts relative to the other induces a switching pulse which is used for disconnecting the drive of the manipulator.

In the embodiment of FIG. 1, the constructional liner part 1 is secured to tool 3 by means of screws 6 through a flange plate 5.

Part 1 comprises a hub-like portion which is surrounded by part 2. The outer circumference 7 of part 1 is cambered, so that a spherical joint is formed between the two parts 1, 2. Between parts 1 and 2, at various locations in the circumferential direction, preferably at three equidistantly spaced locations, centering balls 8 are provided forming part of a non-positive clamping connection of the two parts. The centering ball 8 is guided for radial displacement in a guideway 9. From the outside, a radial force is applied to ball 8, exerted by a spring stack 12 which is guided in an attached casing 11 and can be adjusted as desired by means of a clamping member 13. The clamping member 13 is accessible from the outside, so that the device can be adjusted without disassembling the individual constructional parts.

At the inside of the centering ball 8, a spherical guide surface 14 is provided on an insert of the constructional part 1. This spherical guide surface 14 bounds a bore 15 extending through the insert and through inner constructional part 1, in which two balls 27 and 28 are received for displacement. One of these balls 27 is a spacer element, the other ball 28 is a connecting element. Balls 27, 28 and 8 are located on a common radial plane and are in contact with each other. Any yielding motion of ball 8 in any direction thus results in a motion of balls 27, 28 in response thereto.

Spacers balls 27 cooperate with chamfers 24 of two operating members which are embodied by discs 16,17 in the present example, and held in a spaced apart position. Discs 16 and 17 are coaxial and parallel with each other and connected to each other through threaded bolts 18. The bolts are screwed in disc 17. Between the bolt head and the other disc 16, a compression spring 19 is inserted urging the two discs 16 and 17 against each other.

One of the discs 17 carries a proximity switch 20 which is responsive to the distance between the two discs. If this distance becomes reduced beyond a predetermined limit, switch 20 causes a disconnection of the drive motor. For this purpose, a set screw 22 screwed in disc 16, in the present example, extends through disc 17 and carries a control lug 21 forming a stop and cooperating with switch 20. Set screw can be adjusted by means of a lock nut 23.

In normal operation, centering ball 8 radially biased by spring stack 12 presses balls 27, 28 inwardly and spacer ball 27 thus holds disc 16, 17 spaced apart by a predetermined distance. Discs 16,17 are prevented from rotary motion by at least one pin 25 engaging a slot 26 of disc 16. The clamping force between discs 16 and 17 can be adjusted through spring 19 by means of bolt 18.

As soon as a relative motion between constructional parts 1, 2 changes the position of centering balls 8 relative to their spherical guide surfaces 14, the spacing between discs 16, 17 is reduced, switch 20 is actuated, and drive is disconnected. To prevent constructional parts 1, 2 from moving out of their predetermined position in the structure and becoming detached, one or more locking bolts 29 are provided engaging with a considerable allowance a recess 30 of the other part.

Figure 2:
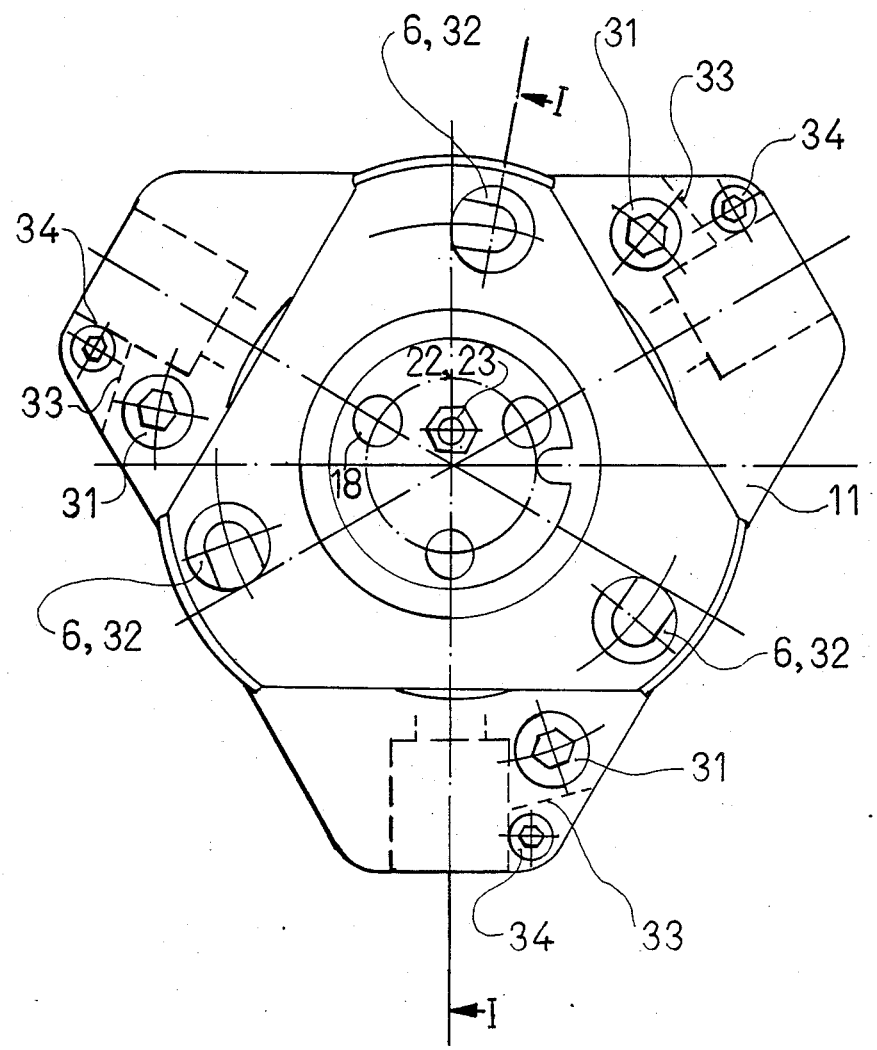
FIG. 2 is a front view of a device according to FIG. 1.

FIG. 2 shows screws 31 for connecting the outer constructional part 2 to the last secondary member 4 of the manipulator arm, and screws 32 for connecting inner part 1 to tool 3.

The individual attached casings of outer part 2 are designed, in this embodiment, to permit rotary motion of clamping member 13 and to fix the adjusted angular position thereof. For this purpose, a slot 33 is provided (FIG. 2). Screws 34 make it possible to clamp attached casing 11 against clamping member 13 and thus fix the position thereof.

While specific embodiments of the invention have been shown and described in detail to illustrate the application of the principles of the invention, it will be understood that the invention may be embodied otherwise without departing from such principles.

What is claimed is:

1. A safety device for a manipulator having a first constructional part and a second constructional part operatively connected to said first constructional part, with a drive for moving the second constructional part, comprising:

said first constructional part carrying a circumferential guide surface;

casing means connected to said second constructional part for defining a plurality of circumferentially spaced guideways each extending toward said circumferential guide surface;

a plurality of centering balls each disposed for movement in one of said guideways;

ball biasing means biasing each of said centering balls toward and into engagement with said circumferential guide surface for holding said first constructional part in a centered position with respect to said second constructional part;

a pair of operating disks disposed in said first constructional part;

coaxial guide means connected between said operating disks for holding said operating disks coaxially to each other while permitting movement of said operating disks toward and away from each other;

a plurality of spacer elements held by said first constructional part and circumferentially spaced around said operating disks, said spacer elements each engaged against said operating disks for holding said operating disks apart;

switch means operatively connected to said operating disks and adapted for connection to the manipulator drive for deactivating the manipulator drive when a distance between said operating disks changes; and a plurality of connecting members each held for radial movement of said first constructional part and each engaged between one of said centering balls and one of said spacer elements so that, when said first constructional part moves out of said centered position with respect to said second constructional part in any direction, said centering balls urge said spacer elements to move through said connecting members to change the spacing between said operating disks so as to activate said switch means and deactivate the manipulator drive.

2. A device according to claim 1, wherein each of said spacer elements comprise a spacer ball and each of said connecting members comprises a connecting ball, said first conventional part including a plurality of radial bores each extending from said circumferential guide surface to said disks, each radial bore containing one spacer ball and one connecting ball and being positioned adjacent one centering ball.

3. A safety device according to claim 2, including anti-rotation means connected between said first constructional part and said operating disks for holding said operating disks from rotation with respect to said first constructional part while permitting axial movement of at least one of said operating disks.

4. A device according to claim 3, wherein said operating disks each have a rim for engaging said spacer balls, each rim being chamfered.

5. A device according to claim 3, wherein said circumferential guide surface of said first constructional part is spherical for receiving said centering balls.

6. A device according to claim 3, wherein said switch means comprises a proximity switch mounted on one of said operating disks and activatable with a change of distance between said disks.

7. A device according to claim 3, wherein said first constructional parts includes a hub-shaped portion carrying said circumferential guide surface on an outer surface thereof and having an inner axial opening, said operating disks being mounted in said axial opening and said radial bores extending through said hub.

8. A device according to claim 7, wherein said ball biasing means comprises a spring stack in each guideway and clamping means in each guideway for holding each spring stack against each centering ball respectively.

9. A device according to claim 1, wherein said circumferential surface is spherical for receiving said centering balls, anti-rotation means connected between said first constructional part and said operating disks for holding said operating disks from rotating with respect to said first constructional part while permitting axial movement of at least one of said operating disks, said first constructional part including a plurality of radial bores circumferentially spaced therearound, each radial bore containing one of said spacer elements and one of said connecting members.

10. A device according to claim 9, wherein said coaxial guide means comprise a plurality of bolts extending through said operating disks, each bolt permitting axial movement of said operating disks toward and away from each other, and a spring engaged between each bolt and one of said operating disks for urging said operating disks together, said spacer elements each comprising a spacer ball, said operating disk having facing rims therearound which are engaged by said spacer balls for urging said operating disks apart.

11. A device according to claim 10, wherein said rims of said operating disks are chamfered.

12. A device according to claim 11, wherein said switch means comprises a proximity switch mounted on one of said disks and activatable with a change in spacing between said disks, and a stop element adjustably connected to the other of said disks and cooperating with said proximity switch for activating said proximity switch.

13. A device according to claim 12, wherein each of said guideways comprises a radially extending chamber for receiving one centering ball, said ball biasing means comprising a spring stack in each chamber and a clamp in each chamber holding said spring stack against one of said centering balls.

* * * * *